(12) United States Patent
Kondo

(10) Patent No.: US 8,912,262 B2
(45) Date of Patent: Dec. 16, 2014

(54) HEAT CURABLE SILICONE RUBBER COMPOSITION

(71) Applicant: Momentive Performance Materials Japan LLC, Tokyo (JP)

(72) Inventor: Hideo Kondo, Tokyo (JP)

(73) Assignee: Momentive Performance Materials Japan LLC, Tokyo (JP)

(*) Notice: Subject to any disclaimer, the term of this patent is extended or adjusted under 35 U.S.C. 154(b) by 0 days.

(21) Appl. No.: 14/192,132

(22) Filed: Feb. 27, 2014

(65) Prior Publication Data

US 2014/0179870 A1 Jun. 26, 2014

Related U.S. Application Data

(63) Continuation of application No. PCT/JP2013/050313, filed on Jan. 10, 2013.

(30) Foreign Application Priority Data

Aug. 2, 2012 (JP) ................. 2012-171730

(51) Int. Cl.
*C08K 3/22* (2006.01)
*C08K 3/36* (2006.01)
*C08K 5/14* (2006.01)
*C08L 83/06* (2006.01)

(52) U.S. Cl.
CPC ... *C08K 3/36* (2013.01); *C08K 3/22* (2013.01); *C08K 5/14* (2013.01); *C08L 83/06* (2013.01)
USPC .......................................... 524/403; 524/413

(58) Field of Classification Search
USPC ................................. 524/413, 403
See application file for complete search history.

(56) References Cited

U.S. PATENT DOCUMENTS 8,084,529 B2  12/2011  Hasegawa et al.
2006/0142453 A1*  6/2006  Jerschow et al. ............. 524/403

FOREIGN PATENT DOCUMENTS

| EP | 2 105 467 A1 | 9/2009 |
|---|---|---|
| JP | 36-006189 | 11/1958 |
| JP | 37-000837 | 11/1959 |
| JP | 02-045564 A | 2/1990 |
| JP | 03-12586 B2 | 2/1991 |
| JP | 2000-247641 * | 9/2000 |
| JP | 2000-247641 A | 9/2000 |
| JP | 2010-529258 A | 8/2010 |
| JP | 2010-529259 A | 8/2010 |
| WO | WO 2008/082001 A1 | 7/2008 |
| WO | WO 2008/154319 A1 | 12/2008 |
| WO | WO 2008/154327 A1 | 12/2008 |

* cited by examiner

*Primary Examiner* — Margaret Moore
(74) *Attorney, Agent, or Firm* — Foley & Lardner LLP

(57) ABSTRACT

There is provided a silicone rubber composition whose compression set in a higher temperature range, particularly at 200° C. or higher, in a silicone rubber to be obtained is sufficiently suppressed. A heat curable silicone rubber composition contains: (A) 100 parts by mass of a polyorganosiloxane having an average degree of polymerization of 500 to 20,000 and having two or more alkenyl groups in a molecule; (B) 5 to 100 parts by mass of a filler; (C) an effective amount of an organic peroxide; and (D) 0.06 to 15 parts by mass of a hydrous cerium oxide and/or a hydrous zirconium oxide each having one absorption band in 3300 to 3500 $cm^{-1}$ and two or more absorption bands in 1300 to 1700 $cm^{-1}$ in infrared absorption spectrum measurement.

4 Claims, 7 Drawing Sheets

HEAT CURABLE SILICONE RUBBER COMPOSITION

CROSS-REFERENCE TO RELATED APPLICATIONS

This application is a continuation of prior International Application No. PCT/JP2013/050313 filed on Jan. 10, 2013 which is based upon and claims the benefit of priority from Japanese Patent Application No. 2012-171730 filed on Aug. 2, 2012; the entire contents of all of which are incorporated herein by reference.

FIELD

The present invention relates to a heat curable silicone rubber composition.

BACKGROUND

It has been conventionally known that when oxide or hydroxide of cerium or zirconium is compounded into a silicone rubber, the silicone rubber to be obtained improves in heat resistance and compression set (see, for example, Patent Reference 1 (JP-B 1961-006189 (KOKOKU)) and Patent Reference 2 (JP-B 1962-000837 (KOKOKU))). Further, in order to impart better heat resistance and compression set to a silicone rubber, for example, a silicone rubber in which silica carrying oxide particle of cerium, nickel, iron, or cobalt is highly dispersed (see Patent Reference 3 (JP-B 1991-012586 (KOKOKU))) and a silicone elastomer containing cerium oxide having an increased BET specific surface area (see Patent Reference 4 (JP-A 1990-045564 (KOKAI))) have been suggested.

However, according to Patent Reference 5 (WO 2008/082001 A1), an uncured silicone rubber composition in which cerium oxide powder is compounded has a problem of increasing in viscosity or generating gel if it is let stand at a temperature above 70° C. Hence, Patent Reference 5 discloses that a heat curing silicone rubber composition excellent in thermal stability during manufacture and in an uncured state and excellent in heat resistance after curing can be provided by specifying the total light transmittance when a predetermined amount of cerium oxide powder is dispersed in an uncured silicone rubber composition.

Note that though preferable properties such as the surface characteristics are specified about oxide and hydroxide of cerium and zirconium in view of improvement in heat resistance and compression set of a silicone rubber containing the above in the conventional technique, the relation between the chemical structural characteristics of these compounds and the heat resistance and compression set of the silicone rubber containing them has not been made clear yet.

In such a situation, it has been desired to develop a silicone rubber composition capable of manufacturing a silicon rubber whose compression set in a higher temperature range, for example, in a temperature range of 200° C. or higher, is sufficiently suppressed by selectively using a chemical compound which is capable of improving the compression set in the higher temperature range by being compounded into the silicone rubber from among cerium compounds and zirconium compounds.

SUMMARY OF THE INVENTION

The present invention is made in consideration of the above viewpoints, and its object is to provide a silicone rubber composition whose compression set in a high temperature range, particularly at 200° C. or higher, is sufficiently suppressed in a silicone rubber to be obtained.

A heat curable silicone rubber composition of the present invention contains:

(A) 100 parts by mass of an alkenyl group-containing polyorganosiloxane expressed by a following general formula (1), having an average degree of polymerization of 500 to 20,000, and having two or more alkenyl groups in a molecule,

[Chemical Formula 1]

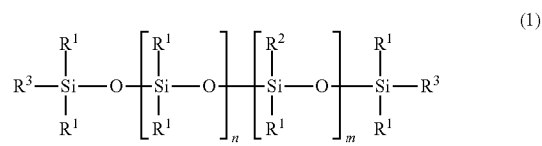

where $R^1$ represents an unsubstituted or substituted monovalent hydrocarbon group containing no aliphatic unsaturated group, $R^2$ represents an alkenyl group, $R^3$ represents a monovalent group indicating $R^1$ or $R^2$, or hydroxyl group independently, n and m represent the total numbers of each recurring units obtained by random polymerization or block polymerization, and n+m+2 obtained by adding 2 that is the number of terminal groups to n and m represents an average degree of polymerization;

(B) 5 to 100 parts by mass of a filler;
(C) an effective amount of an organic peroxide; and
(D) 0.06 to 15 parts by mass of a hydrous oxide selected from the group consisting of a hydrous cerium oxide and a hydrous zirconium oxide each having one absorption band in 3300 to 3500 cm$^{-1}$ and two or more absorption bands in 1300 to 1700 cm$^{-1}$ in infrared absorption spectrum measurement.

According to the present invention, it is possible to provide a silicone rubber composition whose compression set in a high temperature range, particularly at 200° C. or higher, is sufficiently suppressed in a silicone rubber to be obtained using the above.

DETAILED DESCRIPTION

Figure 1:
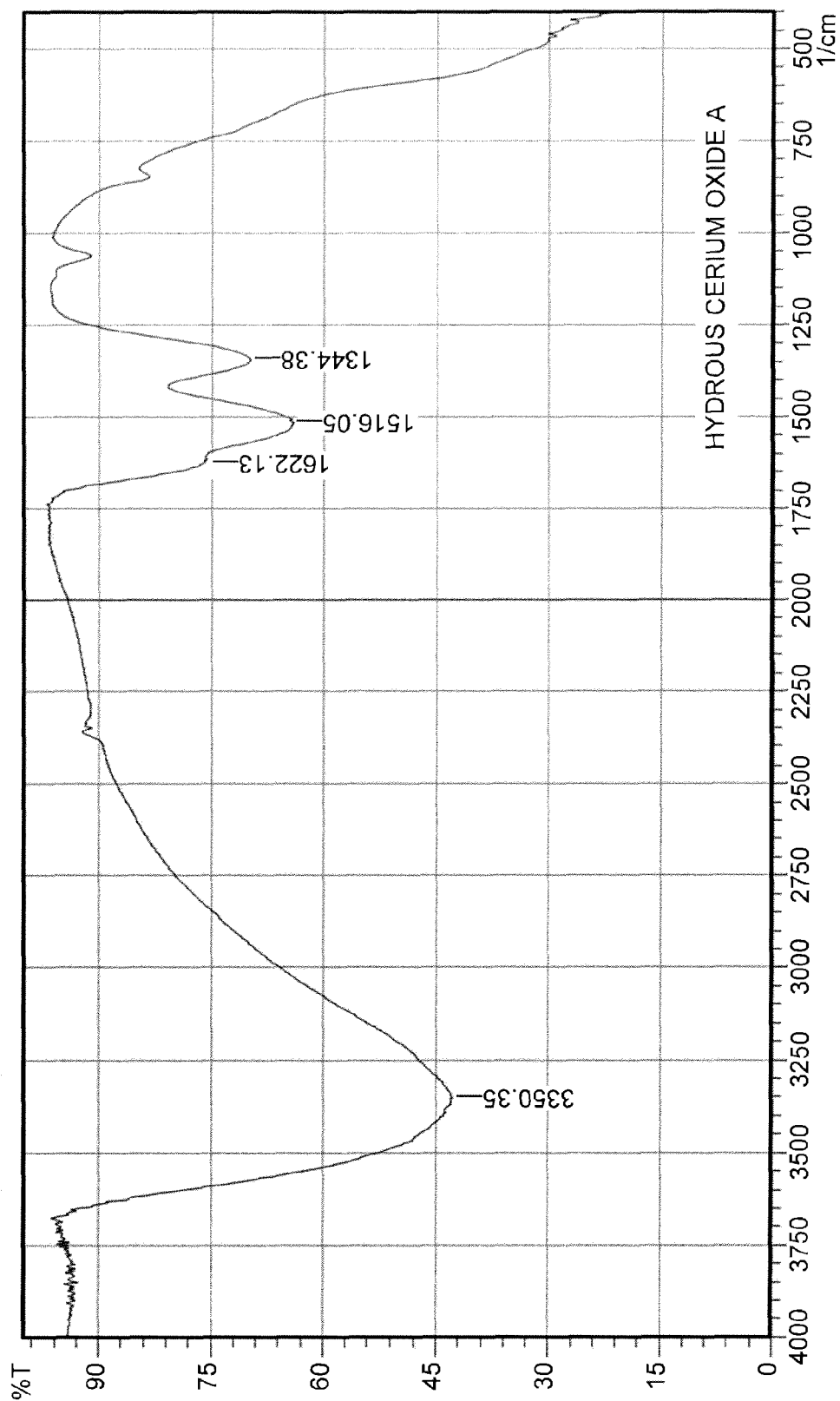
FIG. 1 is a graph indicating an infrared spectrum of hydrous cerium oxide A used in examples.

Hereinafter, an embodiment of the present invention will be described.

A heat curable silicone rubber composition in the embodiment of the present invention contains: (A) 100 parts by mass of an alkenyl group-containing polyorganosiloxane expressed by the above general formula (1), having an average degree of polymerization of 500 to 20,000 and having two or more $R^2$ in a molecule; (B) 5 to 100 parts by mass of a filler; (C) an effective amount of an organic peroxide; and (D) 0.06 to 15 parts by mass of a hydrous oxide selected from the group consisting of a hydrous cerium oxide and a hydrous zirconium oxide each having one absorption band in 3300 to 3500 $cm^{-1}$ and two or more absorption bands in 1300 to 1700 $cm^{-1}$ in infrared absorption spectrum measurement.

The heat curable silicone rubber composition in the embodiment of the present invention contains, as the (D) component, a hydrous cerium oxide having the above-described characteristic absorption bands (peaks) in an infrared absorption spectrum and/or a hydrous zirconium oxide having the above-described characteristic absorption bands (peaks) in an infrared absorption spectrum, thereby keeping the compression set in a high temperature range, particularly at 200° C. or higher, sufficiently low in a silicone rubber to be obtained by thermally curing the heat curable silicone rubber composition.

Here, oxide, hydroxide, or hydrate which does not have a certain hydrous composition is called hydrous oxide, and hydrous oxide of cerium is called a hydrous cerium oxide and hydrous oxide of zirconium is called a hydrous zirconium oxide in this specification.

Hereinafter, components will be explained.

((A) Component)

An alkenyl group-containing polyorganosiloxane being the (A) component is a base polymer of a composition in the embodiment of the present invention which is cross-linked and cured by heating and further by catalysis of a later-described (C) organic peroxide. The (A) component is a substantially linear siloxane macromolecule expressed by the following general formula (1):

[Chemical Formula 2]

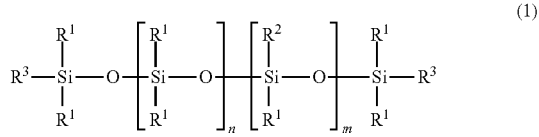

(1)

(In the formula (1), $R^1$ represents an unsubstituted or substituted monovalent hydrocarbon group containing no aliphatic unsaturated group, $R^2$ represents an alkenyl group, and $R^3$ represents a monovalent group indicating $R^1$ or $R^2$, or a hydroxyl group independently. In the formula (1), n and m represent the total numbers of each recurring units obtained by random polymerization or block polymerization, and n+m+2 obtained by adding 2 that is the number of terminal groups to n and m represents an average degree of polymerization). Hereinafter, the polyorganosiloxane expressed by the general formula (1) is sometimes referred to as a polyorganosiloxane (1).

Note that the above general formula (1) does not always mean a block copolymer. More specifically, m representing the number of —$R^1R^2SiO$— as intermediate units and n representing the number of —$R^1{}_2SiO$— as intermediate units do not represent the numbers in a block but represent the total numbers of the intermediate units existing in the whole molecule respectively. In other words, the polyorganosiloxane expressed by the general formula (1) may be a random copolymer. A siloxane skeletal structure of the polyorganosiloxane (1) is substantially linear because of ability of synthesizing a polymer with high degree of polymerization indicated below with good controllability and may include few branches such as a plurality of branches in a molecule.

The average degree of polymerization of the polyorganosiloxane (1), that is, the number of siloxane units is expressed by n+m+2 obtained by adding 2 that is the number of terminal groups to n and m in the general formula (1) and ranges from 500 to 20,000. The average degree of polymerization preferably ranges from 1,000 to 10,000. If the average degree of polymerization of the polyorganosiloxane (1) is less than 500, required operability cannot be obtained. On the other hand, if the average degree of polymerization of the polyorganosiloxane (1) exceeds 20,000, polymerization becomes difficult.

The polyorganosiloxane (1) has two or more $R^2$s (including $R^2$s in terminal units represented as $R^3$s) being alkenyl groups in a molecule. Hereinafter, when referring to the amount of $R^2$s in a molecule in the polyorganosiloxane (1), the amount includes $R^2$s in terminal units represented as $R^3$s. The content of $R^2$s in a molecule in the polyorganosiloxane (1) is two or more per molecule and preferably 100 or less, and more preferably 50 or less. If the content of $R^2$s exceeds 100 per molecule, the cured product becomes fragile and is unlikely to have sufficient strength.

n and m are appropriately selected so that the requirement of the above-described average degree of polymerization is satisfied and the number of $R^2$s is two or more. Preferably, n and m are selected so that the number of $R^2$s pre molecule is 2 to 100.

$R^1$ is independently an unsubstituted or substituted monovalent hydrocarbon group containing no aliphatic unsaturated group. Examples of $R^1$ include unsubstituted hydrocarbon groups such as: alkyl groups including a methyl group, an ethyl group, a propyl group, a butyl group, a pentyl group, a hexyl group and so on; aryl groups including a phenyl group, a tolyl group, a xylyl group and so on; aralkyl groups including a benzyl group a phenethyl group and so on; and substituted hydrocarbon groups such as a chloromethyl group, a 3-chloropropyl group, a 3,3,3-trifluoropropyl group, a 3-cyanopropyl group, and a 3-methoxypropyl group. In the general formula (1), a plurality of $R^1$s may be either the same or different. $R^1$s are preferably the same in terms of easy synthesis, but a different group may be introduced into a part of them in accordance with the physical properties required for a silicone rubber to be obtained.

For easiness of synthesis and handling of the polyorganosiloxane (1) and excellent heat resistance, preferably 50% or more of $R^1$s are methyl groups, and particularly preferably all of $R^1$s are methyl groups. Further, for the purpose of imparting oil resistance and/or solvent resistance to the silicone rubber to be obtained, a combination of a part of $R^1$s composed of 3,3,3-trifluoropropyl groups and all of the remaining $R^1$s composed of methyl groups can be used. In this case, a combination of a part of $R^1$s in a unit surrounded by n in the formula (1) being 3,3,3-trifluoropropyl groups and all of the remaining $R^1$s being methyl groups is preferable.

$R^2$ is an independent alkenyl group. Concrete examples of $R^2$ include a vinyl group, an allyl group, a 3-butenyl group, a 4-pentenyl group, a 5-hexenyl group and so on. For easiness of synthesis and handling of the polyorganosiloxane (1) and easy addition reaction, $R^2$ is preferably a vinyl group. $R^2$s may be bonded to any silicon atoms in a molecule, but a part of $R^2$s are preferably bonded to silicon atoms at molecular terminals because they exhibit excellent reactivity. In the general formula (1), a plurality of $R^2$s may be either the same or different and are preferably the same in terms of easy synthesis.

$R^3$ independently represents a monovalent group indicating $R^1$ or $R^2$, or hydroxyl group. Two $R^3$s may be either the same or different and are preferably the same in terms of easy synthesis. Preferable examples of $R^3$ include a vinyl group, a hydroxyl group and a methyl group. Further, in the heat curable silicone rubber composition in the embodiment of the present invention, one kind of them may be used or two or more kinds may be used in combination as the (A) component.

((B) Component)

In the heat curable silicone rubber composition in the embodiment of the present invention, a filler being the (B) component is a component having a function of imparting appropriate fluidity to the composition before thermal curing and imparting a high mechanical strength to a silicone rubber to be obtained by heat-curing the composition. Concrete examples of the filler include inorganic fillers, such as silica powders including fumed silica, arc silica, precipitated silica, silica aerogel, pyrogenic silica and the like, and fine particle titanium oxide such as aerosol titanium oxide and the like, and a silica powder is preferably used. As the silica powder, a publicly-known one that is generally compounded in a silicone rubber is employable.

The silica powder used as the filler being the (B) component preferably has a specific surface area measured by the BET method (hereinafter, referred to as a BET specific surface area) of 50 $m^2/g$ or more, more preferably 50 to 600 $m^2/g$, and much more preferably 100 to 400 $m^2/g$ to serve the above-described function by being added to the composition in the embodiment of the present invention. The kind of silica is not particularly limited, but precipitated silica, fumed silica, pyrogenic silica or the like is preferably used. In terms of reinforcing property, fumed silica is preferable.

Since many silanol groups (Si—OH groups) exist on the surface of the silica powder, thickening, remarkable plasticization return and so on may occur if the silica powder is added as it is to the heat curable silicone rubber composition. In such a case, it is only necessary to add silica powder having the surface subjected to hydrophobic treatment to the heat curable silicone rubber composition. As the silica powder used as the filler being the (B) component, silica powder which has been previously subjected to surface treatment in a powder state may be used, or silica powder may be subjected to surface treatment in a kneading process.

As the surface treatment method of the silica powder, a generally known surface treatment technique can be employed. Examples of an organosilicon compound used as a surface treatment agent include organosilazanes such as a hexaorganodisilazane and an octaorganotrisilazane; a silane coupling agent expressed by $SiR^{11}_{(4-p)}X_p$ (where p represent an integer of 1 to 3, X represents a hydrolyzable group such as a methoxy group, an ethoxy group, a chlorine atom or the like, $R^{11}$ represents an alkyl group or an alkenyl group having 1 to 4 carbon atoms which may be substituted by a chlorine atom, and when there are a plurality of Xs and $R^{11}$s, they may be either the same or different); dimethylpolysiloxane (including a cyclic structure), organohydrogenpolysiloxane and so on, and may be a partial hydrolysis reaction product thereof. Note that among them, a silane-based coupling agent having methyl groups as substituents bonded to the silicon atoms other than the hydrolyzable groups, cyclic dimethylpolysiloxane, and organosilazanes are preferable.

As the silica powder used as the filler being the (B) component, a commercially-available product may be used. Examples of the commercially-available product include Aerosil 200 (trade name, manufactured by Nippon Aerosil, BET specific surface area: 200 $m^2/g$), Aerosil 300 (trade name, manufactured by Nippon Aerosil, BET specific surface area: 300 $m^2/g$) and the like as the fumed silica with the surface untreated. Further, in the present invention, silica powder made by subjecting the commercially-available product to the surface treatment with an octamethylcyclotetrasiloxane, a hexamethyldisilazane or the like may be used.

As the filler being the (B) component, one kind of them may be used or two or more kinds may be used in combination. A compounding amount of the (B) component in the composition in the embodiment of the present invention is 5 to 100 parts by mass per 100 parts by mass of the (A) component, and preferably 15 to 60 parts by mass. If the compounding amount of the filler being the (B) component exceeds 100 parts by mass, the viscosity of the composition significantly increases to degrade the workability in molding, whereas if the compounding amount is less than 5 parts by mass, the characteristics of the mechanical strength and so on of a silicone rubber to be obtained are not sufficient.

((C) Component)

An organic peroxide being the (C) component is a catalyst component for cross-linking and curing the heat curable silicone rubber composition in the embodiment of the present invention during heating. The organic peroxide being the (C) component is not particularly limited as long as it is generally used in this kind of heat curable silicone rubber composition. Concrete examples of the organic peroxide include benzoyl peroxide, 2,4-dichlorobenzoyl peroxide, p-chlorobenzoyl peroxide, dicumyl peroxide, p-methyl benzoyl peroxide, 2,5-dimethyl-2,5-di(t-butyl peroxy)hexane, 2,5-bis(t-butyl peroxy)-2,5-dimethylhexyne, di-t-butyl peroxide, t-butyl peroxy benzoate, and bis(4-t-butyl cyclohexyl) peroxy dicarbonate.

Among these organic peroxides, 2,5-dimethyl-2,5-di(t-butyl peroxy)hexane is preferable. As the (C) component, one kind of them may be used or two or more kinds may be used in combination.

A compounding amount of the (C) component in the composition in the embodiment of the present invention is an effective amount catalyzing the crosslinking and curing reaction of the (A) component. Concretely, the compounding amount of the (C) component is preferably 0.01 to 5 parts by mass per 100 parts by mass of the (A) component, and more preferably 0.1 to 2 parts by mass. If the compounding amount of the (C) component is less than 0.01 parts by mass, the crosslinking and curing reaction of the (A) component does not sufficiently proceed in some cases, whereas if the compounding amount exceeds 5 parts by mass, the characteristics such as heat resistance may be degraded in a silicone rubber to be obtained.

((D) Component)

The (D) component is a hydrous oxide selected from the group consisting of a hydrous cerium oxide having one absorption band in 3300 to 3500 $cm^{-1}$ and two or more absorption bands in 1300 to 1700 $cm^{-1}$ in infrared absorption spectrum (hereinafter, referred to as "IR spectrum") measurement, and a hydrous zirconium oxide having one absorption band in 3300 to 3500 $cm^{-1}$ and two or more absorption bands in 1300 to 1700 $cm^{-1}$ similar to the above in the IR spectrum measurement.

Here, in the IR spectrum of the hydrous cerium oxide or the hydrous zirconium oxide, the absorption band in 3300 to 3500 $cm^{-1}$ is identified as the absorption band exhibiting stretching vibration of OH groups. Further, the absorption band seen in 1300 to 1700 $cm^{-1}$ attributes to deformation vibration of OH groups, and the case where there are a plurality of absorption bands indicates the existence of non-equivalent OH groups.

The hydrous oxide such as the hydrous cerium oxide, the hydrous zirconium oxide or the like, which is to be used as the (D) component in the heat curable silicone rubber composition in the embodiment of the present invention having the above characteristics in the IR spectrum can be a hydrous oxide having OH groups in which a plurality of kinds of non-equivalent OH groups exist. In the IR spectrum, the number of absorption bands seen in 1300 to 1700 cm$^{-1}$ only needs to be two or more and preferably three or more.

Here, confirmation of the hydrous cerium oxide or the hydrous zirconium oxide employable as the (D) component is performed by measuring the IR spectrum by an ordinary method and determining whether the IR spectrum satisfies the above condition of the absorption bands. In the determination, the width and the height of the absorption bands in the IR spectrum are not especially limited, but the determination is made by counting the numbers of absorption hands existing in the wavelength ranges.

Such hydrous cerium oxide or hydrous zirconium oxide can be manufactured as follows. Concretely, taking the hydrous zirconium oxide as an example, the hydrous zirconium oxide can be obtained by a method of hydrolyzing a soluble zirconium salt solution to prepare slurry, adding a base to the obtained slurry to produce oxide, separating and collecting the oxide, and drying it. The hydrous cerium oxide can be manufactured by changing the soluble zirconium salt solution to a soluble cerium salt solution.

Note that it is preferable that the hydrous cerium oxide or the hydrous zirconium oxide used as the (D) component has preferably, for example, a mass decrease rate of 1 to 80% when it is dried at 150° C. for one hour as well as the above-described IR spectrum characteristics. A mass decrease rate during heating falling within the above range is preferable in terms of an effect of reducing the compression set in a high temperature range of a silicone rubber to be obtained.

Further, the average particle size measured by a laser diffraction scattering particle size distribution measuring device for the hydrous cerium oxide or the hydrous zirconium oxide each having the above-described IR spectrum characteristics used as the (D) component is preferably 0.01 to 100 μm, and more preferably 0.1 to 20 μm. The average particle size of the (D) component falling within the above range is preferable in that the influence on the mechanical strength of a silicone rubber to be obtained can be made small.

Figure 2:
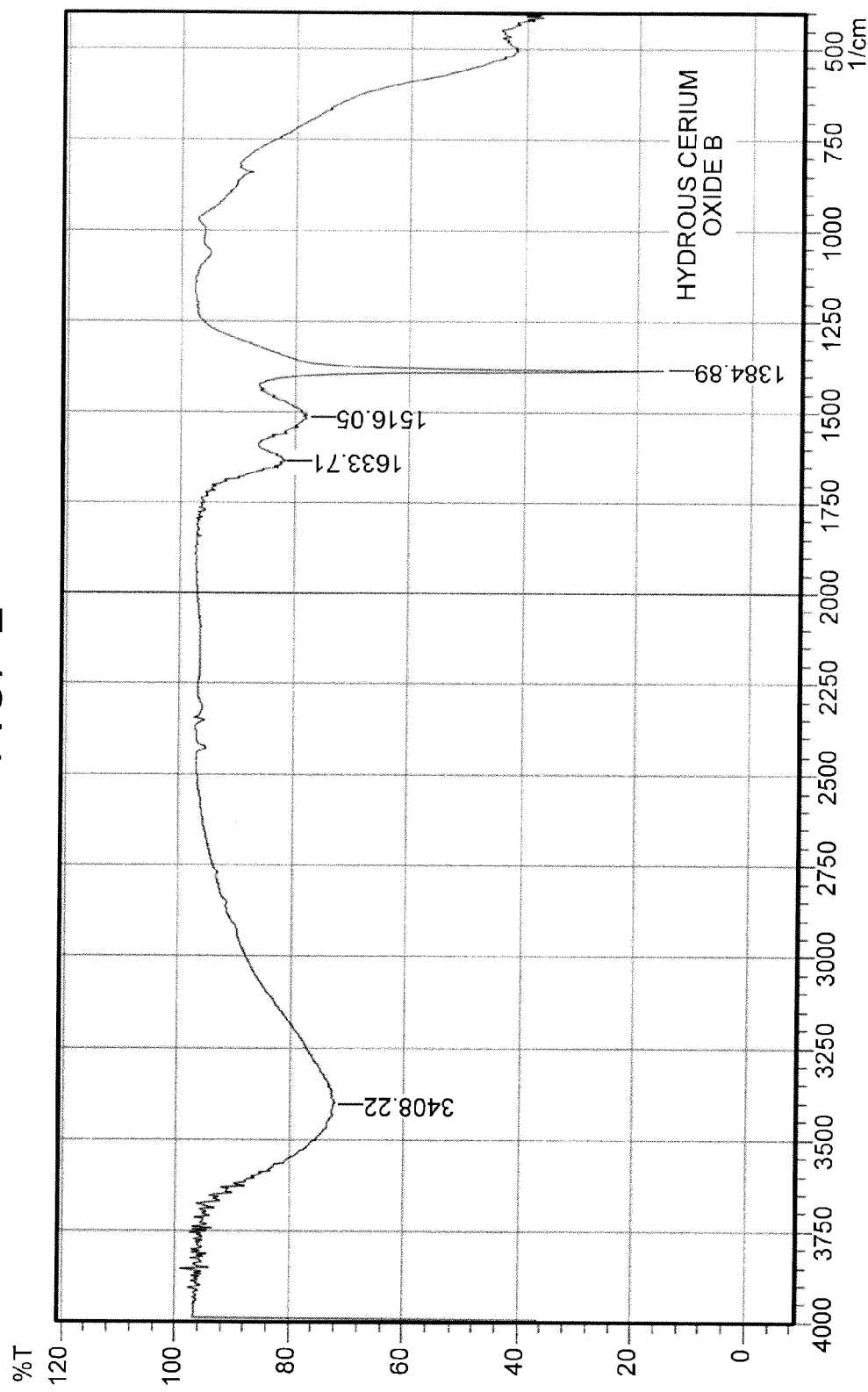
FIG. 2 is a graph indicating an infrared spectrum of hydrous cerium oxide B used in the examples.
Figure 3:
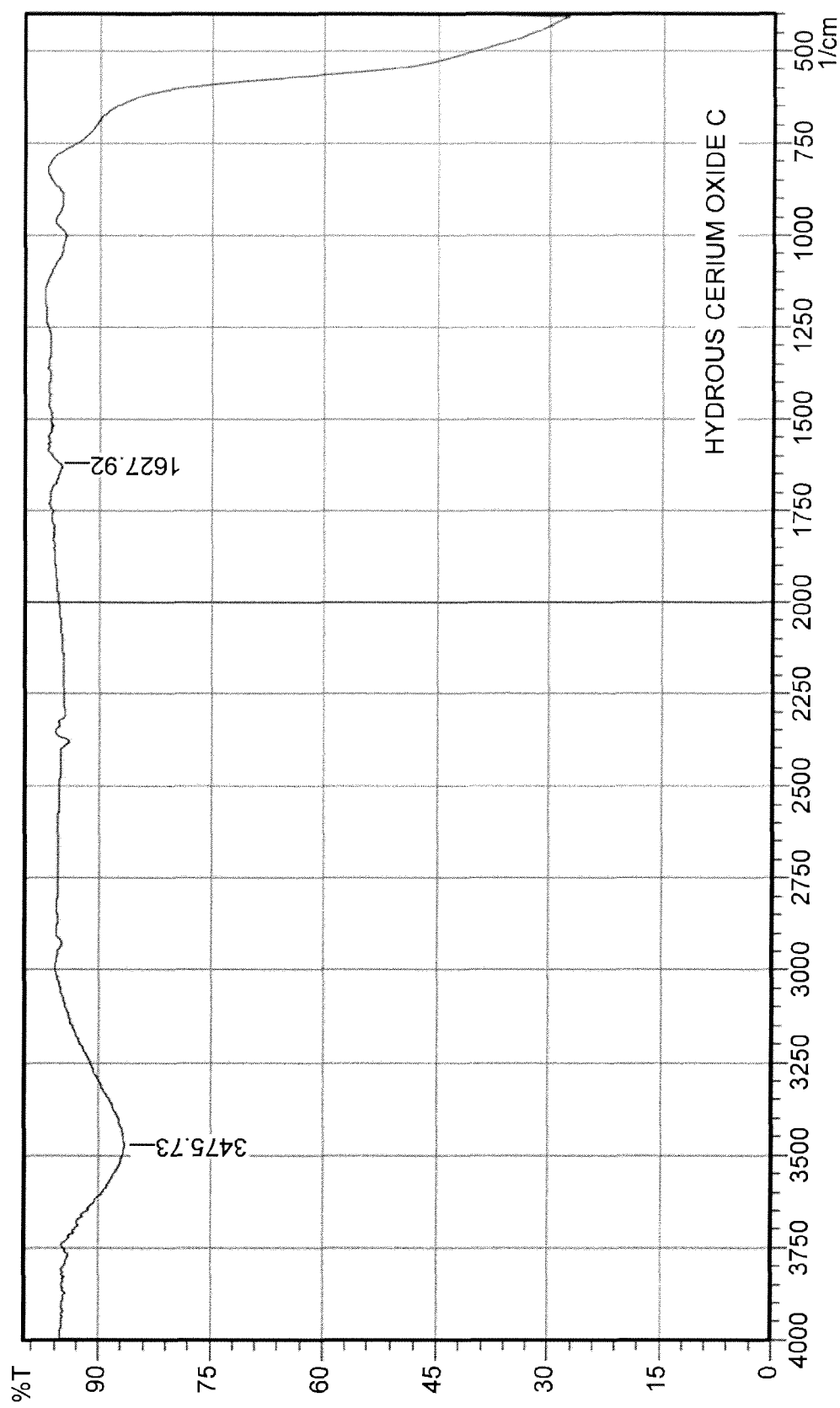
FIG. 3 is a graph indicating an infrared spectrum of hydrous cerium oxide C used in comparative examples.
Figure 4:
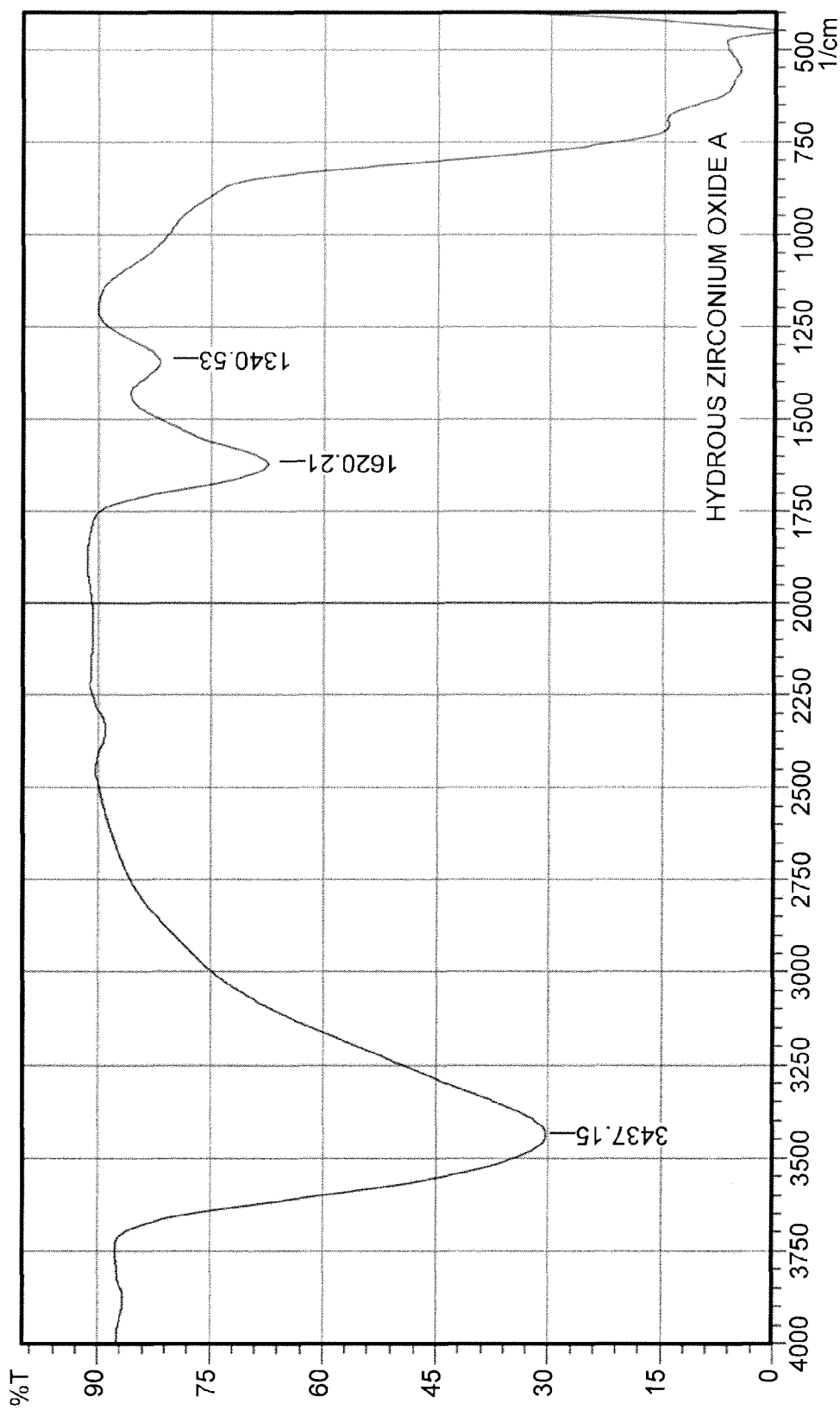
FIG. 4 is a graph indicating an infrared spectrum of hydrous zirconium oxide A used in the examples.
Figure 5:
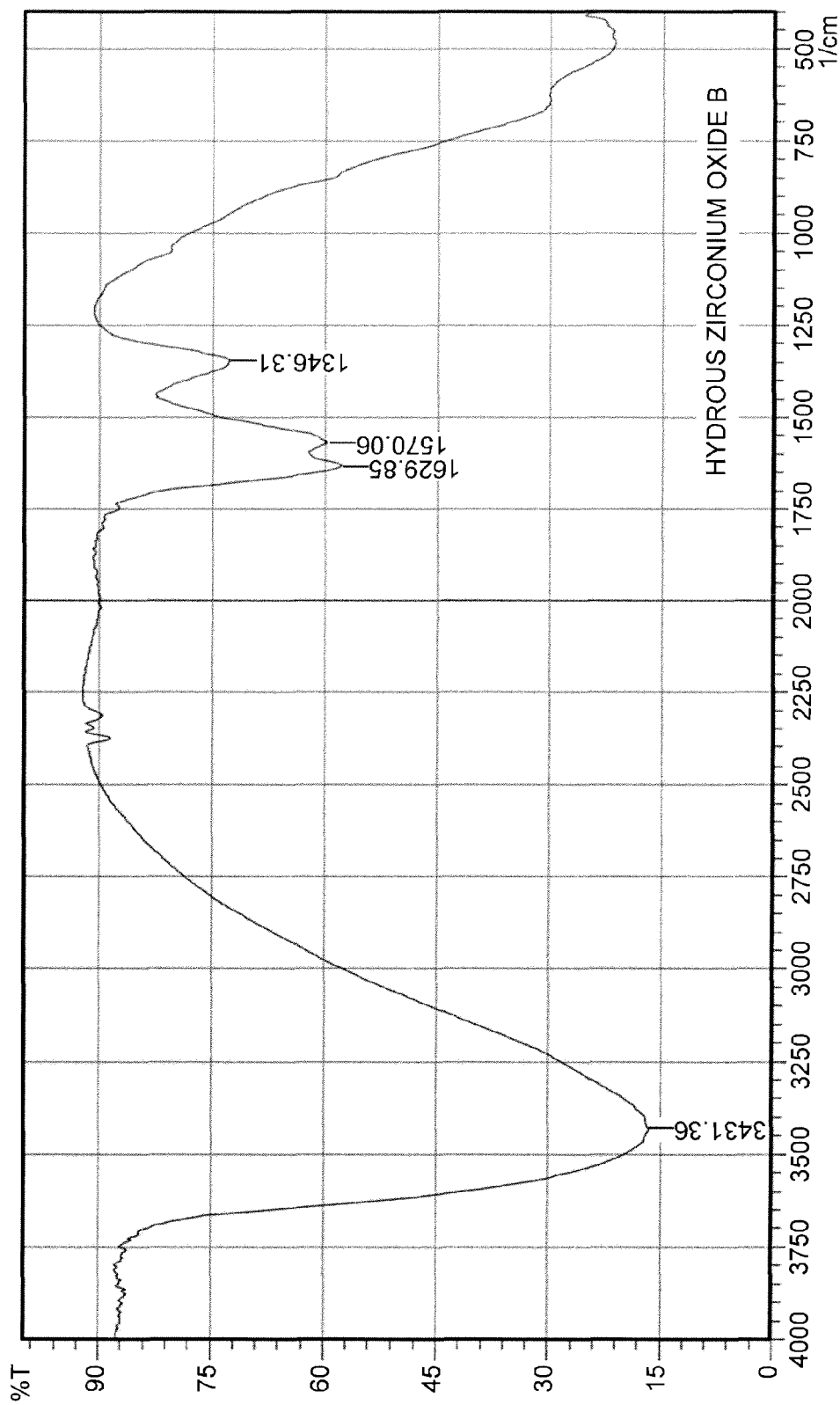
FIG. 5 is a graph indicating an infrared spectrum of hydrous zirconium oxide B used in the examples.
Figure 6:
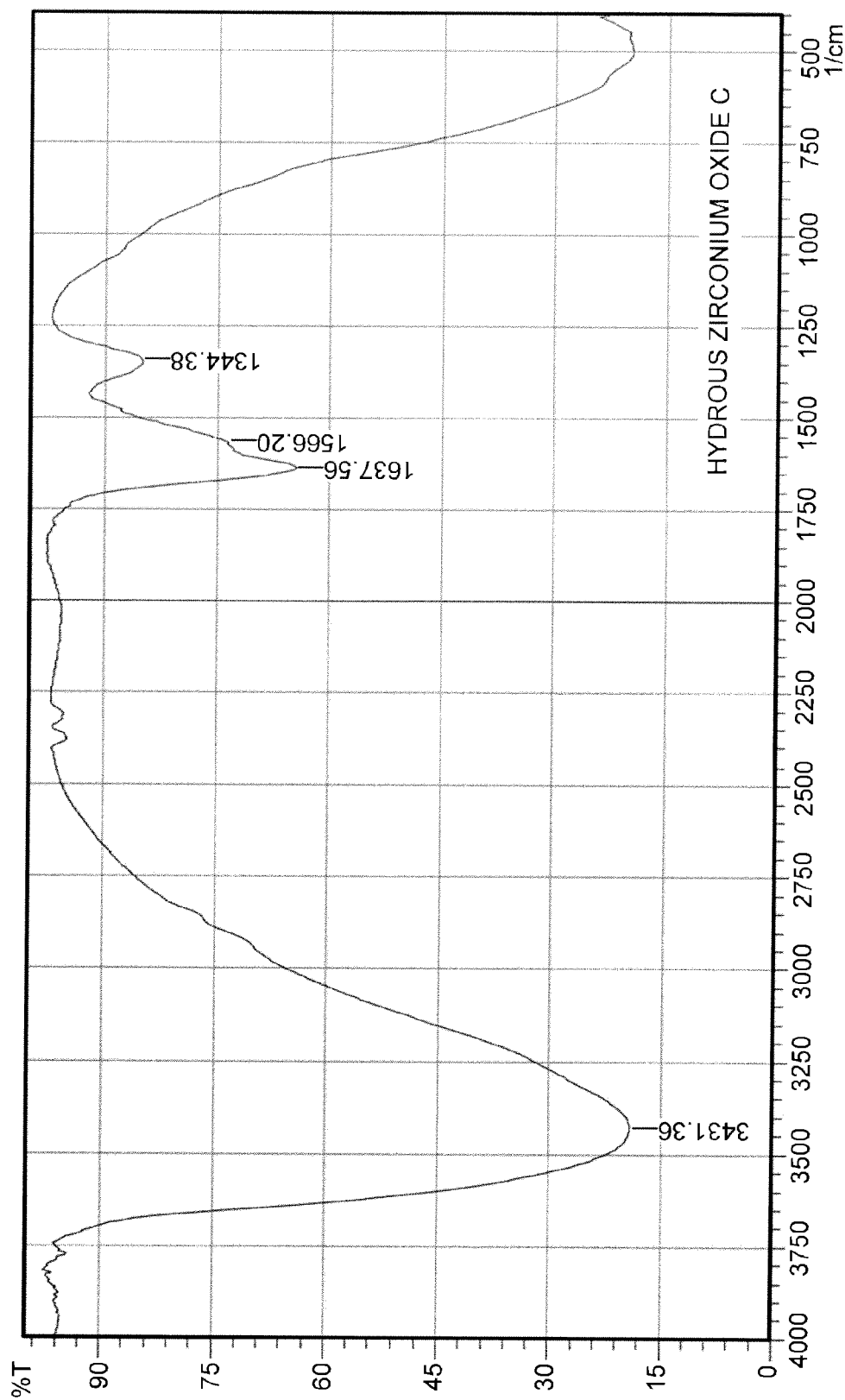
FIG. 6 is a graph indicating an infrared spectrum of hydrous zirconium oxide C used in the examples.
Figure 7:
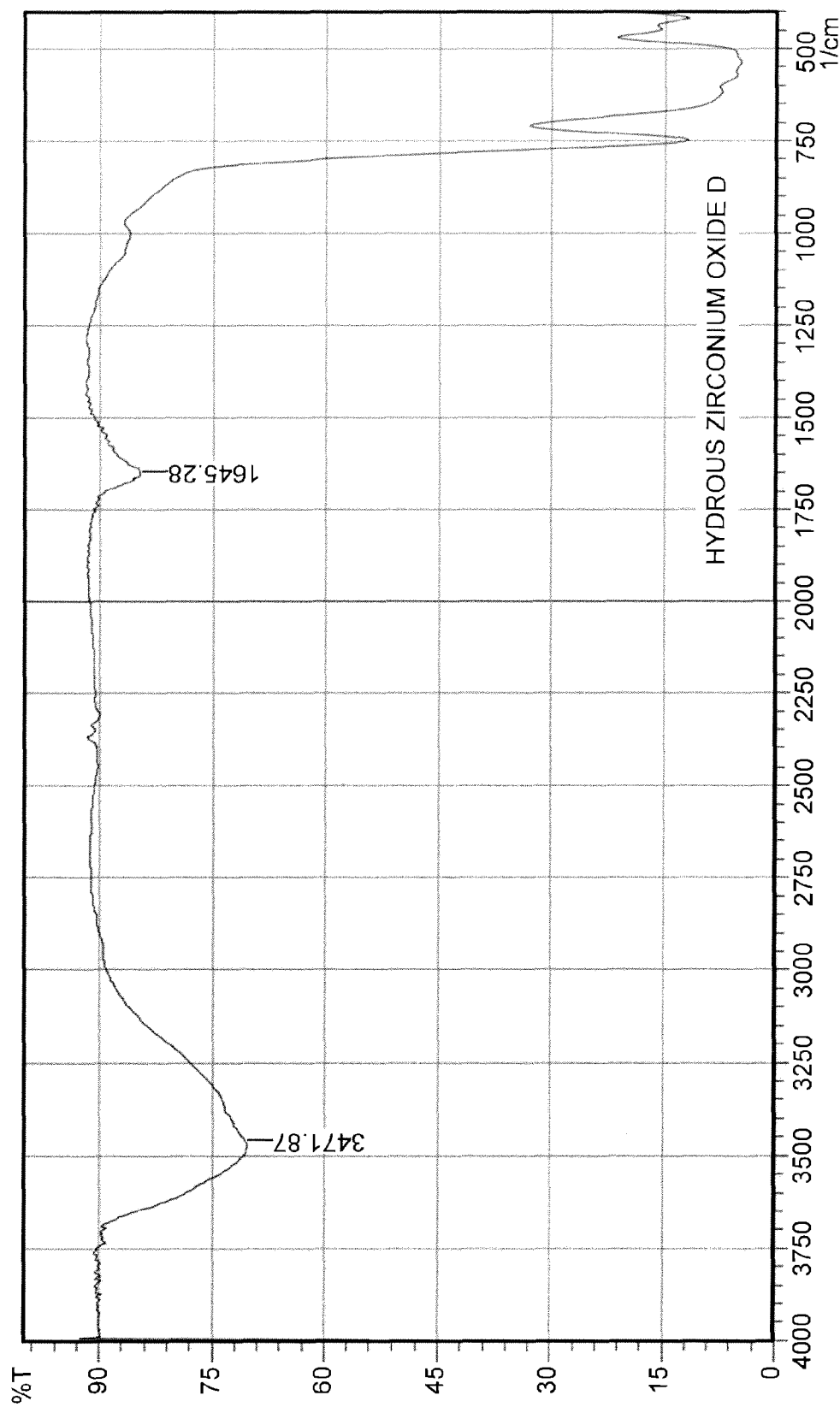
FIG. 7 is a graph indicating an infrared spectrum of hydrous zirconium oxide D used in the comparative examples.

For the hydrous cerium oxide or the hydrous zirconium oxide used as the (D) component, a commercially-available product can be used. Concretely, examples of the hydrous cerium oxide include, in trade name, Cerium hydroxide D (manufactured by DAIICHI KIGENSO KAGAKU KOGYO) whose IR spectrum example is illustrated in FIG. 1, Cerium hydroxide S (manufactured by Nakaya Chemitec) whose IR spectrum example is illustrated in FIG. 2 and the like. Examples of the hydrous zirconium oxide include, in trade name, Zirconium oxide RC-100 (manufactured by DAIICHI KIGENSO KAGAKU KOGYO) whose IR spectrum example is illustrated in FIG. 4, Zirconium hydroxide Z-1904 (manufactured by DAIICHI KIGENSO KAGAKU KOGYO) whose IR spectrum example is illustrated in FIG. 5, Zirconium hydroxide XZ01247/01 (manufactured by MEL Chemicals) whose IR spectrum example is illustrated in FIG. 6 and the like.

One kind of them may be used or two or more kinds may be used in combination as the (D) component. A compounding amount of the (D) component in the composition in the embodiment of the present invention is 0.06 to 15 parts by mass per 100 parts by mass of the (A) component, and preferably 1.0 to 10 parts by mass. If the compounding amount of the (D) component is less than 0.06 parts by mass or exceeds 15 parts by mass, the effect of reducing the compression set in a high temperature range of a silicone rubber to be obtained becomes insufficient, and if the compounding amount exceeds 15 parts by mass, its molding is difficult due to foaming and the mechanical characteristics significantly decreases in the obtained molded product.

(Optional Components)

The heat curable silicone rubber composition in the embodiment of the present invention preferably contains an organosilicon compound having silanol groups at both terminals of a chain expressed by the following formula (2), as the (E) component of aiding uniform compounding of mainly the filler being the (B) component, in particular, the silica powder.

(In the formula (2), $R^4$ independently represents an unsubstituted or halogen-substituted monovalent hydrocarbon group, or a vinyl group, and k is an integer of 1 to 100).

As $R^4$ in the formula (2), concrete examples of the unsubstituted monovalent hydrocarbon group include: alkyl groups such as a methyl group, an ethyl group, a propyl group, a butyl group, a pentyl group, and a hexyl group; aryl groups such as a phenyl group, a tolyl group, and a xylyl group; and aralkyl groups such as a benzyl group and a phenethyl group. Concrete examples of the halogen-substituted hydrocarbon group include a chloromethyl group, a 3-chloropropyl group, a 3,3,3-trifluoropropyl group and the like. A plurality of $R^4$s may be either the same or different. $R^4$s are preferably the same in terms of easy synthesis, but a different group may be introduced into a part of them in accordance with the physical properties to be required.

Among them, a methyl group, a vinyl group, a 3,3,3-trifluoropropyl group and the like are preferable for $R^4$. As the (E) component expressed by the formula (2), following organosilicon compounds (E1) to (E3) each having silanol groups at both terminals of a chain are especially preferable.

(k is an integer of 1 to 100)

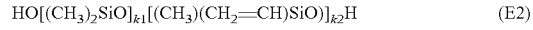

(k1 is an integer of 0 or more, k2 is an integer of 1 or more, a total of k1+k2 is an integer of 1 to 100)

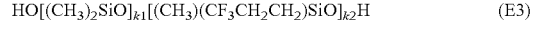

(k1 is an integer of 0 or more, k2 is an integer of 1 or more, a total of k1+k2 is an integer of 1 to 100)

One kind of the (E) component may be used independently or two or more kinds may be used in combination. Further, the (E) component is selectable as necessary according to the kind of $R^1$ in the alkenyl group-containing polyorganosiloxane being the (A) component. For example, in the case where the (A) component is a polyorganosiloxane having a 3,3,3-trifluoropropyl group as $R^1$, it is preferable to use, as the (E) component, an organosilicon compound having silanol groups at both terminals of a chain expressed by the above (E3). In the case where a polyorganosiloxane in which all of $R^1$s are methyl groups is used as the (A) component, an organosilicon compound having silanol groups at both terminals of a chain expressed by the above (E1) is preferably used as the (E) component.

As for the viscosity of the (E) component, the viscosity at 23° C. is preferably 1 to 500 mPa·s, and more preferably 5 to 250 mPa·s in terms of dispersion effect.

A compounding amount of the (E) component in the composition in the embodiment of the present invention is preferably 0.1 to 20 parts by mass per 100 parts by mass of the (A) component, and more preferably 1 to 10 parts by mass though depending on the kind and the compounding amount of the (B) component. If the compounding amount is small, the dispersion effect provided by addition thereof cannot be sufficiently obtained. On the other hand, if the compounding amount is too large, the composition becomes sticky and possibly causes deterioration in workability or mechanical property of the cured product.

In the heat curable silicone rubber composition in the embodiment of the present invention, various additives which have been conventionally used according to various purposes may be compounded, in addition to the above components, in a range not to inhibit the effects of the present invention. Examples of the additives include a conductive material such as a carbon black, pigment, thixotropy imparting agent, viscosity adjuster for improving the extrusion workability, ultraviolet ray protective agent, anti-mildew agent, heat resistance improver, flame retardant, antioxidant and the like.

The heat curable silicone rubber composition in the embodiment of the present invention can be prepared by uniformly kneading the (A) component to the (D) component, and further the (E) component and other components which are compounded as needed, by using a mixing device such as a universal kneading machine, a kneader or the like.

The heating condition when obtaining a silicone rubber using the heat curable silicone rubber composition in the embodiment of the present invention is appropriately selected according to the decomposition temperature of the (C) component and the like. Generally, the heat curable silicone rubber composition is molded into a desired shape under the conditions of 100 to 400° C. for 3 to 30 minutes, for example, by a method of press molding, transfer molding, injection molding, extrusion molding, calendar molding or the like, and then subjected to heat treatment at 150 to 250° C. for 30 to 480 minutes as necessary, whereby a silicone rubber made by crosslinking and curing the heat curable silicone rubber composition is obtained as a molded product.

By manufacturing a silicone rubber using the heat curable silicone rubber composition in the embodiment of the present invention as described above, the silicone rubber whose compression set in a high temperature range, particularly at 200° C. or higher, is sufficiently suppressed can be obtained.

EXAMPLES

Examples of the present invention will be described below but the present invention is not limited to those examples.

In examples and comparative examples, following polyorganosiloxanes were used as the (A) component and the (E) component. Note that siloxane units are represented by the following symbols.

M unit: $(CH_3)_3SiO_{1/2}$—
$M^v$ unit: $(CH_3)_2(CH_2=CH)SiO_{1/2}$—
$M^{OH}$ unit: $(CH_3)_2(OH)SiO_{1/2}$—
D unit: —$(CH_3)_2SiO$—
$D^F$ unit: —$(CH_3)(CF_3CH_2CH_2)SiO$—
$D^v$ unit: —$(CH_3)(CH_2=CH)SiO$—

(A) Component
(Methylvinylpolysiloxane)

Methylvinylpolysiloxane is a linear polydimethylsiloxane containing vinyl groups at both terminals in which $R^1$s are methyl groups, both of two $R^3$s are $R^2$s, and $R^2$s are vinyl groups in the above general formula (1), namely, in which both terminals are blocked with $M^v$ units and intermediate units are composed of D units and $D^v$ units. The average degree of polymerization is 7,000 and the number of vinyl groups ($R^2$s) per molecule is 9.8 on the average.

(Methylvinyltrifluoropropylpolysiloxane)

Methylvinyltrifluoropropylpolysiloxane is a linear polydimethylsiloxane containing vinyl groups at both terminals in which one of $R^1$s is a 3,3,3-trifluoropropyl group in a part of a unit surrounded by n and all of the remaining $R^1$s are methyl groups, both of two $R^3$s are hydroxyl groups, and $R^2$s are vinyl groups in the above general formula (1), namely, in which both terminals are blocked with $M^{OH}$ units and intermediate units are composed of D units, $D^F$ units and $D^v$ units. The average degree of polymerization is 2,500 and the number of vinyl groups ($R^2$s) per molecule is 10 on the average.

(E) Component
(Silanol Terminated Dimethylsiloxaneoligomer)

Silanol terminated dimethylsiloxaneoligomer is an organosilicon compound having silanol groups at both terminals of a chain expressed by the above (E1), and has a viscosity of 30 mPa·s.

(Silanol Terminated Methyltrifluoropropylsiloxaneoligomer)

Silanol terminated methyltrifluoropropylsiloxaneoligomer with both terminals blocked with silanol groups is an organosilicon compound having silanol groups at both terminals of a chain expressed by the above (E3), and has a viscosity of 80 mPa·s.

Note that the viscosity of the (E) component is a value measured at a temperature of 23° C. by a rotational viscometer.

Further, as the (B) component, the (C) component, and the (D) component, the following fillers, organic peroxides and hydrous oxides were used in the examples and comparative examples.

(B) Component
Fumed silica: Aerosil 200 (trade name, manufactured by Nippon Aerosil), the BET specific surface area by the BET method being 200 $m^2/g$ (C) Component
2,5-dimethyl-2,5-di(t-butyl peroxy)hexane (D) Component
As the (D) component used in the examples and comparative examples, hydrous cerium oxides A, B and hydrous zirconium oxides A, B, C being commercially-available products whose trade names and manufacturers are listed below in Table 1 were prepared. Further, as the (D)' component used in the comparative examples whose conditions of absorption bands of the IR spectra are outside the range of the (D) component, a hydrous cerium oxide C and a hydrous zirconium oxide D being commercially-available products whose trade names and manufacturers are listed below in Table 1 were prepared. For each of the hydrous oxides, the IR spectrum was measured by a KBr tablet method by using an infrared spectrum measuring apparatus (IR Prestige-21, manufactured by SHIMADZU CORPORATION). The results are illustrated in FIG. 1 to FIG. 7. The numbers of the absorption bands (peaks) in 3300 to 3500 $cm^{-1}$ and 1300 to 1700 $cm^{-1}$ determined from the IR spectrum are listed in Table 1.

Further, the average particle size, the mass decrease rate during heating, and the pH of aqueous dispersion of each hydrous oxide measured by the following methods are listed in Table 1.

Average particle size (μm): measured by a laser diffraction scattering particle size distribution measuring device (LS230, manufactured by Coulter)

pH: 5 mass % aqueous dispersion was measured by a glass electrode type hydrogen ion densitometer (pH-meter) (HM-7E, manufactured by TOA Electronics)

Mass decrease rate during heating (%): the mass after heating for one hour in an oven at 150° C. was measured and used together with the mass before the heating which has been preliminarily measured to calculate the mass decrease rate (%).

of 170° C. for 10 minutes, then subjected to after vulcanization in an oven at 200° C. for 4 hours to prepare a large-size test piece for compression set test, and No. 3 dumbbell shapes as a test piece for measuring initial mechanical characteristics and a test piece for measuring heat resistance, complying with JIS K6249. Following JIS K6249, the test piece for measuring the compression set was used to measure the compression set (under two conditions of a temperature of 180° C. for 24

TABLE 1

| Component | Kind of hydrous cerium oxide and/or hydrous zirconium oxide | Trade Name • Manufacturer | Physical Properties | | | Number of IR Peaks | | IR Graph |
|---|---|---|---|---|---|---|---|---|
| | | | Average particle size (μm) | pH | Mass decrease rate during heating (%) | 1300 to 1700 cm$^{-1}$ | 3300 to 3500 cm$^{-1}$ | |
| (D) | Hydrous cerium oxide A | Cerium hydroxide D manufactured by DAIICHI KIGENSO KAGAKU KOGYO | 4.5 | 7.5 | 8.7 | 3 | 1 | 1 |
| (D) | Hydrous cerium oxide B | Cerium hydroxide S manufactured by Nakaya Chemitec | 5.4 | 4.8 | 17.8 | 3 | 1 | 2 |
| (D)' | Hydrous cerium oxide C | Cerium oxide manufactured by Anan Kasei | 1.7 | 6.6 | 0.1 | 1 | 1 | 3 |
| (D) | Hydrous zirconium oxide A | Zirconium oxide RC-100 manufactured by DAIICHI KIGENSO KAGAKU KOGYO | 2.2 | 7.7 | 2.5 | 2 | 1 | 4 |
| (D) | Hydrous zirconium oxide B | Zirconium hydroxide Z-1904 manufactured by DAIICHI KIGENSO KAGAKU KOGYO | 3.2 | 10 | 66.0 | 3 | 1 | 5 |
| (D) | Hydrous zirconium oxide C | Zirconium hydroxide XZ01247/01 manufactured by MEL Chemicals | 4.1 | 7.1 | 30.3 | 3 | 1 | 6 |
| (D)' | Hydrous zirconium oxide D | Zirconium oxide E101 manufactured by MEL Chemicals | 0.7 | 6.6 | 0.3 | 1 | 1 | 7 |

Examples 1 to 13

The heat curable silicone rubber compositions of examples 1 to 13 were manufactured with compositions listed in Table 2 by the following manner.

First, the (A) component, the (B) component and the (E) component were compounded by a kneader and heat-treated at 150° C. for 1 hour to prepare a silicone rubber compound. To the obtained silicone rubber compound, the (D) component was compounded by the kneader, and then the (C) component was added by using a twin roll mill to obtain the heat curable silicone rubber composition.

[Evaluation]

Various test pieces were fabricated using the heat curable silicone rubber composition obtained in the above and evaluated for the following evaluation items. The results are listed in Table 2 as well.

(Preparation of Test Pieces)

The heat curable silicone rubber composition obtained in the above was subjected to press molding under the condition hours and a temperature of 225° C. for 24 hours) [%]. Note that the temperature conditions for the compression set comply with the temperature condition of JIS K6249 "Testing methods for uncured and cured silicone rubber."

Following JIS K6249, the test piece for measuring initial mechanical characteristics was used to measure the hardness (Type A), the tensile strength [MPa], and the elongation [%]. Further, as the heat resistance test, the test piece for measuring heat resistance was put in a drier at 225° C. for 72 hours. About the test piece after the heat resistance test, the hardness (Type A), the tensile strength [MPa], and the elongation [%] were measured similarly to the above. The obtained measurement values were used to find the change amount from the initial value for the hardness (Type A). For each of the tensile strength [MPa] and the elongation [%], the rate of change from the above initial value was found. Further, the mass change rate [%] of the test piece before and after the heat resistance test was also found to evaluate the heat resistance of rubber physical property.

TABLE 2

| | | | Example Number | | | | | | | | | | | | | |
|---|---|---|---|---|---|---|---|---|---|---|---|---|---|---|---|---|
| | | | E1 | E2 | E3 | E4 | E5 | E6 | E7 | E8 | E9 | E10 | E11 | E12 | E13 |
| Composition (parts by mass) | (A) | methylvinylpolysiloxane | 100 | 100 | 100 | 100 | 100 | 100 | 100 | 100 | 100 | 100 | 100 | — | — |
| | | methylvinyl-trifluoropropylpolysiloxane | — | — | — | — | — | — | — | — | — | — | — | 100 | 100 |
| | (B) | fumed silica | 36 | 36 | 36 | 36 | 36 | 36 | 36 | 36 | 36 | 36 | 36 | 36 | 36 |
| | (C) | 2,5-dimethyl-2,5-di(t-butyl peroxy)hexane | 0.5 | 0.5 | 0.5 | 0.5 | 0.5 | 0.5 | 0.5 | 0.5 | 0.5 | 0.5 | 0.5 | 0.5 | 0.5 |

TABLE 2-continued

| | | | E1 | E2 | E3 | E4 | E5 | E6 | E7 | E8 | E9 | E10 | E11 | E12 | E13 |
|---|---|---|---|---|---|---|---|---|---|---|---|---|---|---|---|
| | (D) | hydrous cerium oxide A | 0.1 | 1 | 3 | 10 | — | — | — | — | — | — | — | 1 | — |
| | | hydrous cerium oxide B | — | — | — | — | 1 | — | — | — | — | — | — | — | — |
| | | hydrous zirconium oxide A | — | — | — | — | — | 0.1 | 1 | 3 | 10 | — | — | — | 1 |
| | | hydrous zirconium oxide B | — | — | — | — | — | — | — | — | — | 1 | — | — | — |
| | | hydrous zirconium oxide C | — | — | — | — | — | — | — | — | — | — | 1 | — | — |
| | (E) | silanol terminated dimethylsiloxaneoligomer | 6 | 6 | 6 | 6 | 6 | 6 | 6 | 6 | 6 | 6 | 6 | — | — |
| | | silanol terminated methyltrifluoropropyl-siloxaneoligomer | — | — | — | — | — | — | — | — | — | — | — | 7 | 7 |
| Evaluation | Compression set | 180° C., 24 hours [%] | 13 | 15 | 14 | 19 | 13 | 18 | 17 | 18 | 19 | 15 | 19 | 11 | 18 |
| | | 225° C., 24 hours [%] | 67 | 52 | 51 | 57 | 49 | 65 | 62 | 64 | 68 | 65 | 65 | 41 | 58 |
| | Initial characteristics | Hardness, JIS Type A | 47 | 47 | 48 | 52 | 47 | 47 | 48 | 49 | 53 | 46 | 50 | 35 | 35 |
| | | Tensile strength [MPa] | 8.1 | 8.7 | 9.1 | 8.9 | 8.7 | 9.5 | 9.7 | 9.6 | 9.3 | 9.5 | 9.9 | 10.6 | 10.9 |
| | | Elongation [%] | 580 | 620 | 620 | 570 | 610 | 640 | 630 | 650 | 610 | 700 | 590 | 540 | 550 |
| | Heat resistance at 225° C. after 72 hours | Hardness change | +3 | +3 | +2 | +3 | +3 | +1 | +1 | +2 | +2 | +3 | 0 | +5 | +8 |
| | | Tensile strength change rate [%] | −2 | −20 | −8 | −6 | +2 | −25 | −16 | −20 | −22 | −11 | −19 | −22 | −67 |
| | | Elongation change rate [%] | −17 | −31 | −24 | −23 | −16 | −25 | −19 | −22 | −25 | −29 | −22 | −30 | −64 |
| | | Mass change rate [%] | −1.2 | −1.2 | −1.3 | −1.3 | −1.1 | −1.1 | −1.0 | −1.1 | −1.2 | −1.3 | −1.5 | −0.9 | −1.7 |

E1 to E13 = Example 1 to Example 13

Comparative Examples 1 to 8

The heat curable silicone rubber compositions listed in Table 3 were obtained similarly to the examples. Further, various test pieces were fabricated, similarly to the above examples, using the obtained heat curable silicone rubber compositions and evaluated for the same evaluation items. The results are listed in Table 3 as well.

As is seen from Table 2 and Table 3, the compression set in a high temperature range, particularly at 200° C. or higher, is sufficiently suppressed in the silicone rubbers obtained by using the heat curable silicone rubber compositions in the examples as compared with the silicone rubbers obtained by using heat curable silicone rubber compositions in the comparative examples.

According to the heat curable silicone rubber composition of the present invention, a silicone rubber compact whose compression set in a high temperature range, particularly at 200° C. or higher, is sufficiently suppressed can be manufactured, and is useful in a field requiring higher reliability in use at a higher temperature.

TABLE 3

| | | | CE1 | CE2 | CE3 | CE4 | CE5 | CE6 | CE7 | CE8 |
|---|---|---|---|---|---|---|---|---|---|---|
| Composition (parts by mass) | (A) | methylvinylpolysiloxane | 100 | 100 | 100 | 100 | 100 | 100 | 100 | — |
| | | methylvinyltrifluoropropylpolysiloxane | — | — | — | — | — | — | — | 100 |
| | (B) | fumed silica | 36 | 36 | 36 | 36 | 36 | 36 | 36 | 36 |
| | (C) | 2,5-dimethyl-2,5-di(t-butyl peroxy)hexane | 0.5 | 0.5 | 0.5 | 0.5 | 0.5 | 0.5 | 0.5 | 0.5 |
| | (D) | hydrous cerium oxide A | — | 0.05 | 20 | — | — | — | — | — |
| | | hydrous zirconium oxide A | — | — | — | — | 0.05 | 20 | — | — |
| | (D)' | hydrous cerium oxide C | — | — | — | 1 | — | — | — | — |
| | | hydrous zirconium oxide D | — | — | — | — | — | — | 1 | — |
| | (E) | silanol terminated dimethylsiloxaneoligomer | 6 | 6 | 6 | 6 | 6 | 6 | 6 | — |
| | | silanol terminated methyltrifluoropropylsiloxaneoligomer | — | — | — | — | — | — | — | 7 |
| Evaluation | Compression set | 180° C., 24 hours [%] | 23 | 21 | N/A (1) | 15 | 20 | N/A (1) | 17 | 30 |
| | | 225° C., 24 hours [%] | 85 | 75 | N/A (1) | 75 | 75 | N/A (1) | 74 | 76 |
| | Initial characteristics | Hardness, JIS Type A | 46 | 46 | N/A (1) | 46 | 46 | N/A (1) | 47 | 35 |
| | | Tensile strength [MPa] | 9.5 | 9.0 | N/A (1) | 8.3 | 9.2 | N/A (1) | 10.2 | 9.3 |
| | | Elongation [%] | 670 | 600 | N/A (1) | 610 | 600 | N/A (1) | 680 | 480 |
| | Heat resistance at 225° C. after 72 hours | Hardness change | +4 | +3 | N/A (1) | +3 | +3 | N/A (1) | +3 | +59 |
| | | Tensile strength change rate [%] | −43 | −20 | N/A (1) | +2 | −30 | N/A (1) | −22 | N/A (2) |
| | | Elongation change rate [%] | −52 | −33 | N/A (1) | −16 | −35 | N/A (1) | −34 | N/A (2) |
| | | Mass change rate [%] | −1.4 | −1.3 | N/A (1) | −1 | −1.3 | N/A (1) | −1.2 | −17.7 |

(1) unmeasurable because test piece could not be fabricated due to foaming during press molding
(2) unmeasurable because of becoming fragile
CE1 to CE 8 = Comparative Example 1 to Comparative Example 8

What is claimed is:

1. A heat curable silicone rubber composition, comprising:
(A) 100 parts by mass of an alkenyl group-containing polyorganosiloxane expressed by a following general formula (1), having an average degree of polymerization of 500 to 20,000, and having two or more alkenyl groups in a molecule,

[Chemical Formula 1]

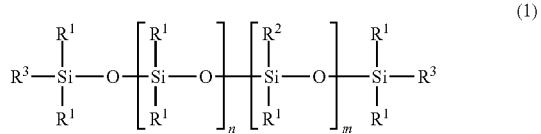

(1)

where $R^1$ represents an unsubstituted or substituted monovalent hydrocarbon group containing no aliphatic unsaturated group, $R^2$ represents an alkenyl group, $R^3$ represents a monovalent group indicating $R^1$ or $R^2$, or hydroxyl group independently, n and m represent the total numbers of each recurring units obtained by random polymerization or block polymerization, and n+m+2 obtained by adding 2 that is the number of terminal groups to n and m represents an average degree of polymerization;

(B) 5 to 100 parts by mass of a filler;

(C) an effective amount of an organic peroxide; and (D) 0.06 to 15 parts by mass of a hydrous oxide selected from the group consisting of a hydrous cerium oxide and a hydrous zirconium oxide each having one absorption band in 3300 to 3500 cm$^{-1}$ and two or more absorption bands in 1300 to 1700 cm$^{-1}$ in infrared absorption spectrum measurement.

2. The heat curable silicone rubber composition according to claim 1, further comprising (E) 0.1 to 20 parts by mass of an organosilicon compound having silanol groups at both terminals of a chain expressed by a following formula (2),

(2)

where $R^4$ independently represents an unsubstituted or halogen-substituted monovalent hydrocarbon group, or a vinyl group, and k is an integer of 1 to 100.

3. The heat curable silicone rubber composition according to claim 1, wherein the (A) component is an alkenyl group-containing polyorganosiloxane in which all of $R^1$s in the formula (1) are methyl groups, and/or an alkenyl group-containing polyorganosiloxane in which a part of $R^1$s in a unit surrounded by n in the formula (1) are 3,3,3-trifluoropropyl groups and all of the remaining $R^1$s in the formula are methyl groups.

4. The heat curable silicone rubber composition according to claim 2, wherein the (A) component is an alkenyl group-containing polyorganosiloxane in which all of $R^1$s in the formula (1) are methyl groups, and/or an alkenyl group-containing polyorganosiloxane in which a part of $R^1$s in a unit surrounded by n in the formula (1) are 3,3,3-trifluoropropyl groups and all of the remaining $R^1$s in the formula are methyl groups.

* * * * *